United States Patent [19]

Schneider et al.

[11] 4,421,830
[45] Dec. 20, 1983

[54] BATTERY HAVING REPLACEABLE ELECTRODES

[76] Inventors: Richard T. Schneider, 3550 NW. 33rd Pl., Gainesville, Fla. 32605; Frederick A. Hauck, 2501 Carew Tower, Cincinnati, Ohio 45202

[21] Appl. No.: 384,914

[22] Filed: Jun. 4, 1982

[51] Int. Cl.³ ........................................... H01M 10/28
[52] U.S. Cl. ..................................... 429/49; 429/113; 429/128; 429/208
[58] Field of Search ..................... 429/49, 17, 19, 127, 429/128, 208, 113, 110

[56] References Cited

U.S. PATENT DOCUMENTS

| | | | |
|---|---|---|---|
| 3,357,864 | 12/1967 | Huber | 429/113 |
| 3,432,354 | 3/1969 | Jost | 429/127 X |
| 3,536,535 | 10/1970 | Lippincott | 429/127 X |
| 3,577,281 | 5/1971 | Pountney et al. | 429/127 X |
| 3,832,237 | 8/1974 | Kinsey | 429/49 |
| 4,127,701 | 11/1978 | Symons et al. | 429/19 |

Primary Examiner—Anthony Skapars
Attorney, Agent, or Firm—Frost & Jacobs

[57] ABSTRACT

A replaceable electrode primary battery utilizing hollow zinc anodic electrodes and hollow nickel oxide cathodic electrodes immersed in a potassium hydroxideelectrolyte solution. The electrodes are arranged in stacks formed by electrically conducting guides contacting the outer surfaces of the spherical electrodes, the respective guides forming the battery anode and cathode. Fresh electrodes are added to the top of the stack from a supply of electrodes, causing a spent electrode to be ejected from the bottom of the stack. The ejected electrode floats to the surface of the electrolyte solution and is collected in a holding compartment. The spent electrodes may be reused by electroplating the appropriate material on the outer surface of the spherical shell. The battery finds particular utility with electric vehicles where electrodes may be dispensed from conventional filling stations.

19 Claims, 4 Drawing Figures

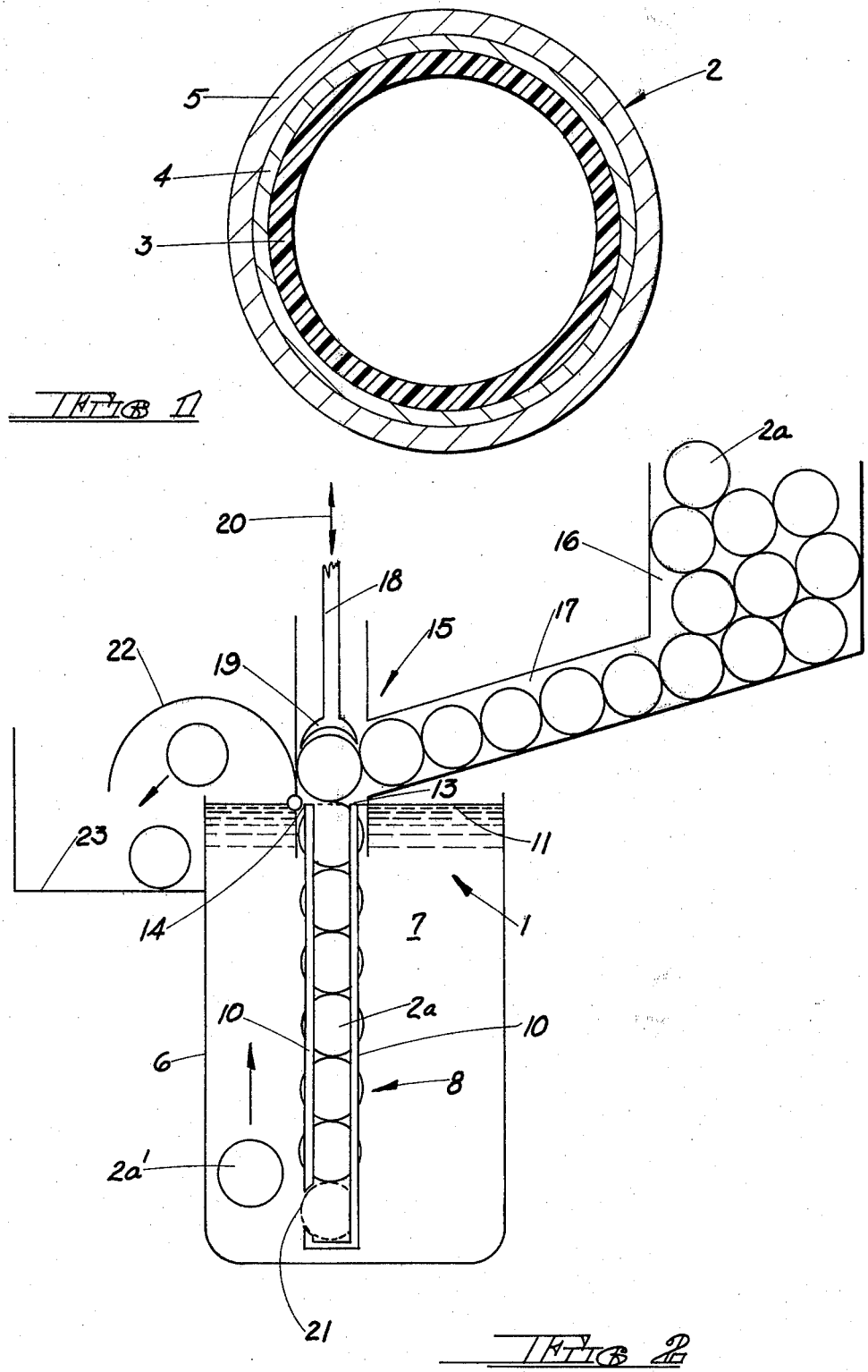

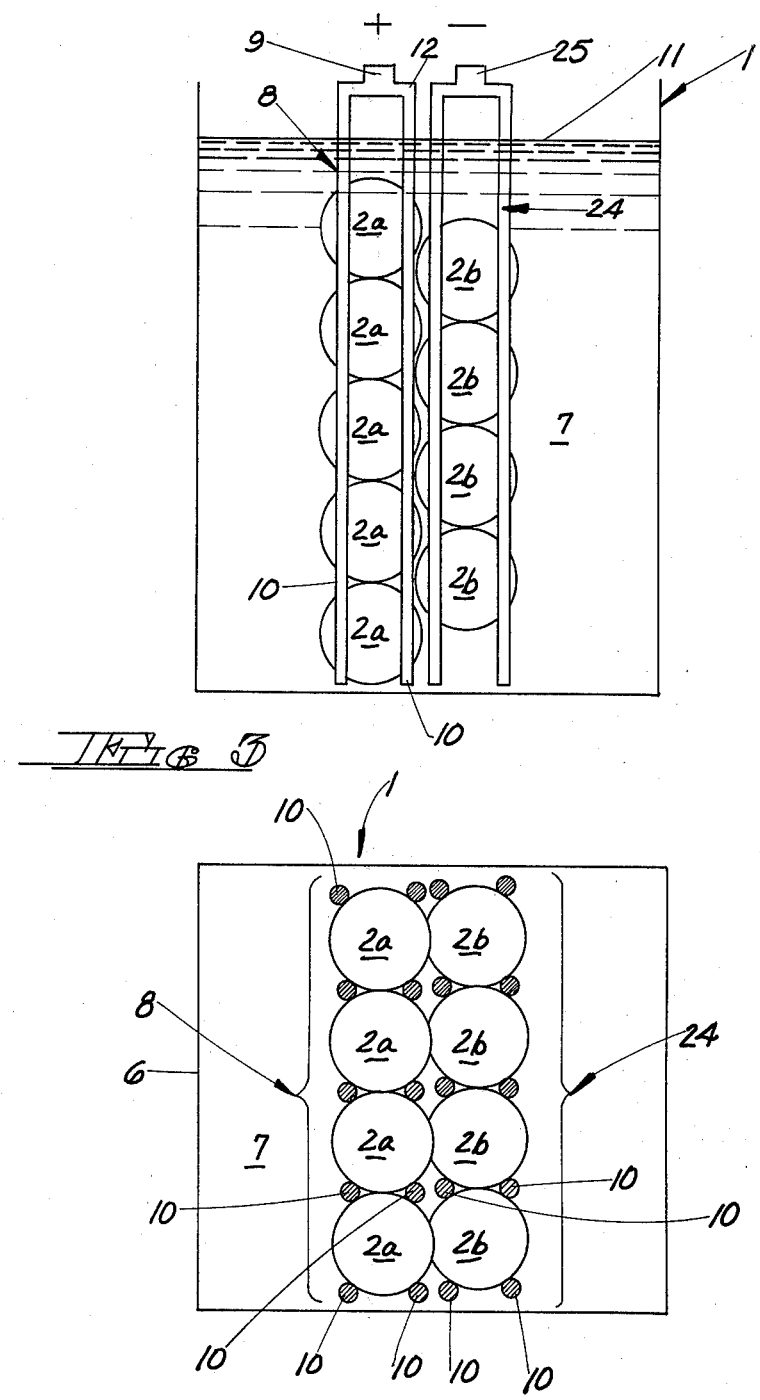

BATTERY HAVING REPLACEABLE ELECTRODES

SUMMARY OF THE INVENTION

The present invention is directed to a primary battery for generating electric current, and more particularly to a primary battery having self-replacing electrodes to make the battery self-repairing.

There has recently been considerable interest in improved primary and secondary batteries, particularly for use as power sources in electric vehicles. The primary focus has been on the secondary or storage cell type of battery, particularly the conventional lead-acid storage cell, which can be easily recharged from domestic power sources. However, the range limitation and high cost of replacement of such batteries have presented major obstacles to their use in electric vehicles.

The present invention is directed to a primary battery, particularly for use in electric vehicles, where the electrodes are replaced by a continuous process. The battery is adapted to various chemical systems, the zinc-nickel combination being illustrated for purposes of an exemplary embodiment.

The battery includes a tank holding a quantity of liquid electrolyte solution, such as potassium hydroxide. The electrodes consist of individual hollow spheres, coated with an active material. The anodic electrodes are coated with a thin layer of an anodic material such as zinc, and are configured to float in the electrolyte solution. Similarly, the cathodic electrodes are coated with a thin layer of cathodic material such as nickel oxide, and are also configured to float in the electrolyte solution.

Means are provided to immerse at least some of the electrodes in the electrolyte solution. These means comprise anode guide means which form the battery annode and include a plurality of parallel vertically extending electrically conducting rod-like guides which extend below the surface of the electrolyte solution. The anodic electrodes are arranged in stacked overlying relationship between the guides, the guides being spaced apart a sufficient distance to make electrical contact with the outer surface of the electrodes while permitting free vertical movement of the electrodes. The upper end of the anode guide means forms an entrance opening to permit entry of one electrode at a time between the guides while preventing escape of electrodes from the upper end of the anode guide means. The lower end of the anode guide means is configured to permit escape of one electrode at a time when the entire stack of electrodes is pushed downwardly to eject the lowermost electrode. A similar construction is employed for holding the cathodic electrodes.

Also associated with each of the anodic and cathodic guide means is a fresh electrode feed means which includes a supply of fresh electrodes positioned near the entrance opening of the corresponding electrode guide means. The fresh electrodes move by gravity one at a time into the opening at the upper end of the guide means and are introduced into the stack of electrodes by means of a plunger when replacement of one or more electrodes is necessary. This operates to move the entire stack of electrodes downwardly to eject the lowermost spent electrode which then floats to the surface of the electrolyte solution and thereafter falls by gravity into a storage compartment. Consequently, new electrodes can be introduced on a continuous basis during operation of the battery.

Furthermore, spent electrodes may be recharged at a central facility, for example by electroplating a thin layer of the appropriate anodic or cathodic material on the outside of a spherical-shaped carrier which may be electrically conducting or non-conducting. Alternatively, fresh electrodes may be dispensed through existing filling station outlets. Consequently, the battery is self-repairing as far as the user is concerned.

The present invention also increases the potential range of electric vehicles with which the battery is used, since a supply of fresh electrodes may be made available for sale at various dispensing stations. Furthermore, the size of the battery can be kept small since it is now primarily an electrical generating device rather than one devoted to the storage of electricity. Storage is accomplished only in the sense of maintaining a supply of spare electrodes in a separate container not filled with electrolyte.

Further features of the invention will become apparent from the detailed description which follows.

BRIEF DESCRIPTION OF THE DRAWING

FIG. 1 is an enlarged cross sectional view of an electrode usable in the battery of the present invention.

FIG. 2 is a schematic side elevation view of the battery of the present invention illustrating the feeding and ejecting features.

FIG. 3 is a schematic front elevational view of the battery of the present invention.

FIG. 4 is a schematic top plan view showing the electrode arrangement of the battery of the present invention.

DETAILED DESCRIPTION

As noted above, the self-repairing battery of the present invention, illustrated generally at 1, is designed to use a number of individual solid-shaped electrodes which can be replaced on a continuous basis during operation of the battery. As used herein "solid-shaped" means having a solid three dimensional geometrical shape, particularly a spherical shape, but not necessarily of the same composition throughout (i.e. including hollow shapes), but specifically excludes flat plate electrodes. A typical one of the electrodes 2, is illustrated in an enlarged cross section in FIG. 1.

In the preferred embodiment illustrated, electrodes 2 are generally spherical in shape and are formed by an electrically conducting or non-conducting spherical hollow shell 3. In general, shell 3 may be formed from a plastic material, although in some instances it may be advisable to make the shell from a base material, germane for the particular electrode.

Shell 3 is coated with a thin layer 4 of inert metal such as gold, silver or copper. However, it will be understood that this intermediate coating may not be necessary in all cases, particulary where shell 3 is formed from a non-reactive material, such as plastic.

The outer surface of the electrode is provided with a layer 5 of a material appropriate to the particular type of electrode, i.e. in the case of an anode electrode the coating will be an anodic material, while in the case of a cathode electrode, the layer will be a cathodic material. The outer layer may be applied to the electrode by electroplating, metal evaporation, sputtering, barrel plating, chemical plating, plasma spraying, or galvanizing. In all events, it is desirable to have a coating with the desired electrical performance, particularly current and power densities.

The actual materials used for electrode 2 will depend upon the actual chemical system chosen for battery 1, e.g. Zn-Ni, Ne-Ni, lead-acid, etc. For purposes of an exemplary showing, the present invention will be described and illustrated in connection with a chemical system using zinc and nickel. However, it is to be understood that this exemplary embodiment is not meant to limit the scope of the present invention.

With such an implementation, the anodic electrodes 2a may be formed from hollow cast zinc spheres provided with a layer 5 of electroplated zinc. Alternatively, the layer 5 of zinc may be provided over the outer surface of a hollow plastic shell 3. Likewise, with the implementation described, the cathodic electrode 2b may be formed by a hollow steel sheet metal sphere provided with a layer 5 of nickel plating, the outer nickel coating being converted to nickel oxide electrolytically. Alternatively, the nickel oxide coating may be provided over a hollow plastic shell. In both instances, the density of the resulting electrode 2 will be such that the electrode will float in the appropriate electrolyte solution, which in the preferred embodiment described may be a water solution of potassium hydroxide.

The construction of battery 1 is illustrated schematically in more detail in FIG. 2–FIG. 4. A tank 6 holds a quantity of the liquid electrolyte solution 7. Means for adding additional electrolyte solution or for purging the solution from the tank are not illustrated.

As can be seen, the anodic electrodes 2a and the cathodic electrodes 2b are arranged in separate stacks, so that electrodes of each type are maintained in overlying contiguous relationship.

The electrodes are held in place by means which immerse at least some of the electrodes in the electrolyte solution. The anodic electrodes 2a are immersed in the electrolyte solution by anode guide means, illustrated generally at 8, the upper end of which also serves to form the battery anode 9. Anode guide means 8 is formed by four parallel equally spaced vertically extending electrically conducting rod-like guides 10 which extend beneath the surface 11 of the electrolyte solution 7 nearly to the bottom of tank 6 as best shown in FIG. 2 and FIG. 3. The upper ends of guides 10 are electrically connected together as at 12 to form the anode terminal 9.

The anodic electrodes 2a are arranged in stacked overlying contiguous relationship between the guides, the guides being spaced apart a distance just sufficient to make electrical contact at all times with the outer surfaces of each electrode 2a, while permitting free vertical movement of the electrodes. Consequently, the electrodes are free to rotate in place between the guides during operation of the battery so as to bring all parts of the outer spherical surface in contact with the electrically conducting guides.

The upper end of guide means 8 forms an opening 13 which permits entry of one electrode at a time between the guides 10. As best shown in FIG. 2, opening 13 will be located a slight distance above the upper surface 11 of the liquid electrolyte solution.

Opening 13 is provided with a catch or gate 14 which permits downward entry of an electrode, but prevents escape of electrodes from the upper end of the anode guide means.

Electrodes 2a may be continuously fed to the stack of electrodes by means of a fresh electrode feed means illustrated generally at 15. Feed means 15 includes a hopper 16 which contains a quantity of the spherical electrodes 2a. The fresh electrodes are fed from hopper 16 to opening 13 by a transport tube 17 dimensioned to permit passage of the electrodes in a straight line, so that the electrodes move by gravity through the transport tube to opening 13. A plunger 18 having a lower end 19 conforming to the shape of the outer surface of the electrodes is mounted for reciprocating vertical movement in the direction of arrows 20 in the upper end of the guide means 8. When plunger 18 is pushed downwardly, the entire stack of electrodes in the guide means 8 is displaced, with the lowermost one of the electrodes being ejected from the bottom of the stack as will be described hereinafter. Thereafter, when plunger 18 is moved upwardly, the next electrode in transport tube 17 will fall onto the top of the stack, thereby replacing the spent electrode at the bottom of the stack with a fresh electrode at the top. This process may continue indefinitely as long as a supply of fresh electrodes exists. Furthermore, plunger 20 may be operated manually, or may be connected to control apparatus (not shown) which replaces the electrodes as necessary for example, after a predetermined time in use has elapsed, or after a predetermined amount of energy has been generated. In any event, the apparatus assures a continuous supply of replacement electrodes for battery 1.

The lower end of guide means 8 is provided with an opening 21 which permits the escape of one electrode at a time when the entire stack of electrodes is moved downwardly in order to eject the lowermost electrode illustrated as 2a' in FIG. 2. Once the ejected electrode 2a' is free from the guide means, it will float to the surface of the electrolyte solution due to the buoyancy of the electrode, will overshoot the surface of the electrolyte solution, and will be deflected by a deflecting hood 22 into a spent electrode storage compartment 23. The spent electrodes may then be removed for disposal or recharging.

The construction and operation of the means 24 for holding, feeding and ejecting cathodic electrodes 2b is identical to that previously described in connection with the apparatus associated with the anodic electrodes, except that the cathodic guide means 24 utilizes a stack of cathodic electrodes 2b with the upper end of means 24 forming the cathode of the battery 25. In all other respects, elements designated similarly to those described hereinabove in connection with the anodic portion of the battery operate similarly.

As can be seen in FIG. 3, the anodic guide means 8 and the cathodic guide means 24 may be placed side-by-side within tank 6. Furthermore, as illustrated in FIG. 4, a plurality of the anodic guide means may be placed one behind the other and connected electrically in series or parallel to satisfy the required voltage or current requirements. As illustrated in FIG. 4, intermediate ones of rod-like guides 10 may be common to adjacent electrode stacks thereby enabling the electrodes to be more densely packed within the battery.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. A battery having replaceable electrodes including an anode and a cathode, a tank holding a quantity of liquid electrolyte solution, a plurality of solid shaped anodic electrodes each having an outer surface comprising an anodic material, a plurality of solid shaped cathodic electrodes each having an outer surface comprising a cathodic material, said electrodes being configured to be bouyant in said electrolyte solution, means for immersing at least some of said electrodes in the electrolyte solution comprising anode guide means making electrical contact with the outer surfaces of the immersed anodic electrodes and electrically connected to the battery anode, and cathode guide means making electrical contact with the outer surfaces of the immersed cathodic electrodes and electrically connected to the battery cathode, and means for replacing individual ones of said electrodes.

2. The battery according to claim 1 wherein said electrodes are spherical-shaped.

3. The battery according to claim 2 wherein said electrodes are hollow.

4. The battery according to claim 3 wherein said anodic and cathodic electrodes comprise a hollow shell coated with the anodic or cathodic material, respectively.

5. The battery according to claim 4 wherein said hollow shell comprises an electrically non-conducting material.

6. The battery according to claim 3 wherein said anodic material comprises zinc, said cathodic material comprises nickel oxide, and said electrolyte solution includes potassium hydroxide.

7. The battery according to claim 1 wherein said anode and cathode guide means comprise stacking means for arranging the respective electrodes in side-by-side relationship.

8. The battery according to claim 7 wherein said stacking means comprises means for arranging the respective electrodes in stacked overlying relationship.

9. The battery according to claim 8 wherein said stacking means comprises a plurality of parallel vertically extending electrically conducting guides extending below the surface of the electrolyte solution, said electrodes being arranged in stacked overlying relationship between said guides, said guides being spaced apart a distance sufficient to make electrical contact with the outer surfaces of the immersed electrodes while permitting free vertical movement of the electrodes.

10. The battery according to claim 9 including a plurality of said stacking means arranged in side-by-side relationship, some of said guides being common to adjacent ones of said stacking means.

11. The battery according to claim 1 wherein said replacing means comprises means for removing spent electrodes from said immersing means and means for adding fresh electrodes to said immersing means.

12. The battery according to claim 11 wherein said anode and cathode guide means comprise stacking means for arranging the respective electrodes in side-by-side relationship, said replacing means comprising means for adding a fresh electrode at one end of a stack and for removing a spent electrode from the other end of the stack.

13. The battery according to claim 11 including a supply of fresh electrodes feeding said replacing means.

14. The battery according to claim 13 wherein said stacking means comprises a plurality of parallel vertically extending electrically conducting guides extending below the surface of the electrolyte solution, said electrodes being arranged in stacked overlying relationship between said guides, said guides being spaced apart a distance sufficient to make electrical contact with the outer surfaces of the immersed electrodes while permitting free vertical movement of the electrodes, said adding means comprising an opening in the upper portion of said guides for emitting a fresh electrode from said electrode supply, said removing means comprising an opening in the lower portion of the guides for ejecting a spent electrode.

15. The battery according to claim 14 wherein said electrodes float to the surface of the solution when ejected from the guide means, and including means for holding said ejected electrodes, said electrodes, when released by the guide means, overshooting the surface of the electrolyte solution and falling by gravity into said holding means.

16. The battery according to claim 1 wherein said electrodes are spherical-shaped, said anode and cathode guide means comprising stacking means for arranging the respective electrodes in stacked overlying relationship, said stacking means including a plurality of parallel vertically extending electrically conducting guides extending below the surface of the electrolyte solution, said electrodes being arranged in stacked overlying relationship between said guides, said guides being spaced apart a distance sufficient to make electrical contact with the outer surfaces of the immersed electrodes while permitting free vertical movement of the electrodes, said replacing means comprising means for removing spent electrodes from the immersing means and for adding fresh electrodes to the immersing means including means for adding a fresh electrode at one end of a stack and removing a spent electrode from the other end of the stack, said adding means comprising an opening in the upper portion of the guides for admitting a fresh electrode, said removing means comprising an opening in the lower portion of the guides for ejecting a spent electrode, said electrodes floating to the surface of the solution when ejected from the guide means, a supply of fresh electrodes feeding said replacing means, and means for holding said ejected electrodes, said electrodes, when released by the guide means, overshooting the surface of the electrolyte solution and falling by gravity into said holding means.

17. The battery according to claim 16 wherein said electrodes are hollow.

18. The battery according to claim 17 wherein said anodic and cathodic electrodes comprise a hollow shell coated with the anodic and cathodic material, respectively.

19. The battery according to claim 18 wherein said anodic material comprises zinc, said cathodic material comprises nickel oxide, and said electrolyte solution includes potassium hydroxide.

* * * * *